United States Patent [19]

Howard

[11] Patent Number: 4,703,476

[45] Date of Patent: Oct. 27, 1987

[54] ENCODING OF TRANSMITTED PROGRAM MATERIAL

[75] Inventor: Jonathan M. Howard, Easthampton, N.Y.

[73] Assignees: Audicom Corporation, New York; Bidco Inc., Hicksville, both of N.Y.

[21] Appl. No.: 926,890

[22] Filed: Nov. 6, 1986

Related U.S. Application Data

[63] Continuation of Ser. No. 533,193, Sep. 16, 1983, abandoned.

[51] Int. Cl.[4] .................................................. H04J 1/02

[52] U.S. Cl. .......................................... 370/76; 375/88

[58] Field of Search .................... 370/69.1, 76; 375/80, 375/82, 91, 88; 340/825.01, 825.2, 825.58

[56] References Cited

U.S. PATENT DOCUMENTS

| | | | |
|---|---|---|---|
| 3,586,781 | 6/1971 | Jones | 455/45 |
| 3,845,391 | 10/1974 | Crosby | 455/45 |
| 3,885,098 | 5/1975 | Dowling | 375/104 |
| 3,938,156 | 2/1976 | Lunden | 370/69.1 |
| 3,947,769 | 3/1976 | Rousos et al. | 375/76 |
| 4,311,964 | 1/1982 | Boykin | 375/83 |
| 4,476,577 | 10/1984 | Matzold et al. | 455/45 |

*Primary Examiner*—Douglas W. Olms

*Attorney, Agent, or Firm*—McAulay, Fields, Fisher, Goldstein & Nissen

[57] ABSTRACT

An audio program is encoded with a subaudible binary code. A first value bit (mark) is a first frequency signal and a second value bit (space) is a second frequency signal. The coded message includes an initialization period constituted by a signal having the mark frequency. In decoding, the mark and space signals are detected through first and second band pass filters specific to the mark and space signal frequencies. The mark and space frequencies are sufficiently different to permit separate filtering. The time duration for each bit of the code is substantial. The decoder through a phase locked loop and integrator reads the bit on the basis of the average value of the bit over the duration of the bit. A synchronization signal provides for synchronous reading of the code. This signal that initiates the decoding operation is generated only in response to the coincident detection of the initialization signal, the notch and a mark response at the phase locked loop.

4 Claims, 6 Drawing Figures

ENCODER

DECODER

ENCODING OF TRANSMITTED PROGRAM MATERIAL

This application is a continuation of application Ser. No. 533,193, filed Sept. 16, 1983, now abandoned.

BACKGROUND OF THE INVENTION

This invention relates in general to a technique for providing a unique identification code for audio material and more particularly for such audio material as is to be broadcast or otherwise transmitted over a medium which generates distortion and noise. For example, this invention permits identifying an advertising commercial that is to be broadcast on radio or television.

There are a number of applications that this invention may have. The one for which it has been specifically designed is for the identification of broadcast material over radio and television. Accordingly, the embodiment described herein will deal with that application of the invention.

A number of systems have been proposed or developed for transmitting auxiliary information along with the main program being broadcast. Super-audible and sub-audible sub-carrier transmission has been used in the prior art for achieving such multiplexing of an allocated broadcast channel. Some idea of the scope of techniques employed can be obtained from a review of U.S. Pat. Nos. 2,766,374, 3,061,783 and 3,391,340. These known techniques are not particularly well adapted for the transmission of unobtrusive signals for identifying or verifying the transmission or reproduction of particular programs. Applicant believes that the most pertinent known prior art system to applicant's invention is that disclosed in U.S. Pat. No. 3,845,391 issued on Oct. 29, 1974 to Murray G. Crosby. The Crosby system employs a short duration, narrow frequency notch in which a substantially inaudible code is located. The code is carried on a sub-carrier through a frequency shift keying (FSK) modulation technique. The sub-carrier is in the frequncy notch. The program is encoded at its beginning and its end. The decoder employed to detect and decode the encoded program employs an appropriate band pass filter that substantially matches the band stop filter employed in the encoder which generates the notch.

The embodiment of the Crosby System disclosed in the Crosby patent requires a code level that tends to be audible particularly where it must overcome the noise and distortion which occurs in connection with some audio broadcasting.

For example, audio broadcasters generally employ a technique of compressing the amplitude differences in the audio signal and transmitting the compressed audio information at the maximum allowable power level. This provides a better signal to noise ratio. It also provides a louder sound at the receiver. And, to some extent, it extends the range of the broadcast station without exceeding the power allocation. One result of this broacasting technique is that material is distorted. This distortion may not be perceived by the ear of a listener, but it is particularly severe on a low power level code residing in a narrow frequency notch.

Accordingly, it is the purpose of this invention to provide an improved encoding technique which will be effective at higher levels of program distortion and higher levels of background noise and non-code audio information than was hitherto the case.

It is a further purpose of this invention to provide these improved characteristics in a context that does not degrade the program material.

It is a further purpose of this invention to provide this enhanced coding technique in equipment that is sufficiently simple, reliable and inexpensive so that it can be used on a wide scale in a number of different types of media.

It is also a purpose of this invention to provide such a technique as will be adapted to automatic detection. Because of this automatic detection, it is important that the technique be relatively forgiving of a wide range of ambient conditions and transmission conditions and also require a decoder that is relatively trouble free.

THE FIGURES

Figure 3:
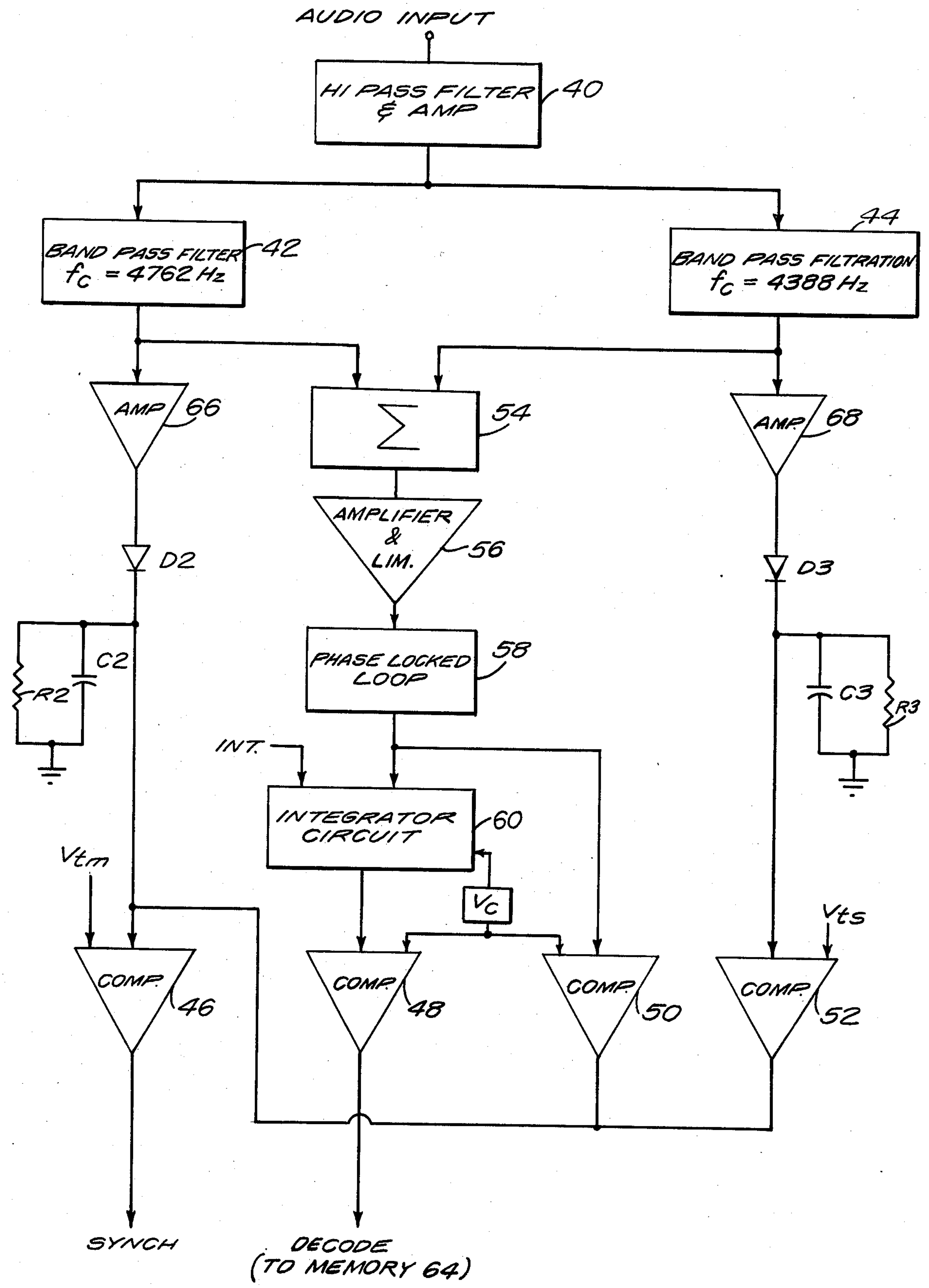
FIG. 3 is a block diagram of the decoder unit for detecting and recording the identification code.
Figure 4:
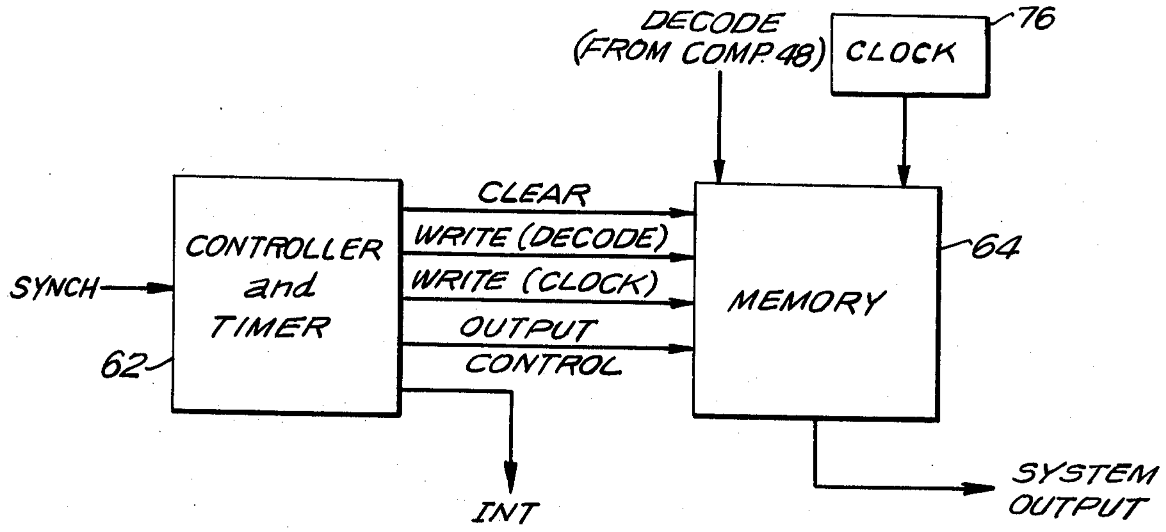
FIG. 4 is a block diagram of the controller unit that operates in connection with the FIG. 3 decoder to provide the appropriate timing for the synchronous decoding of the code signal.
Figure 4A:
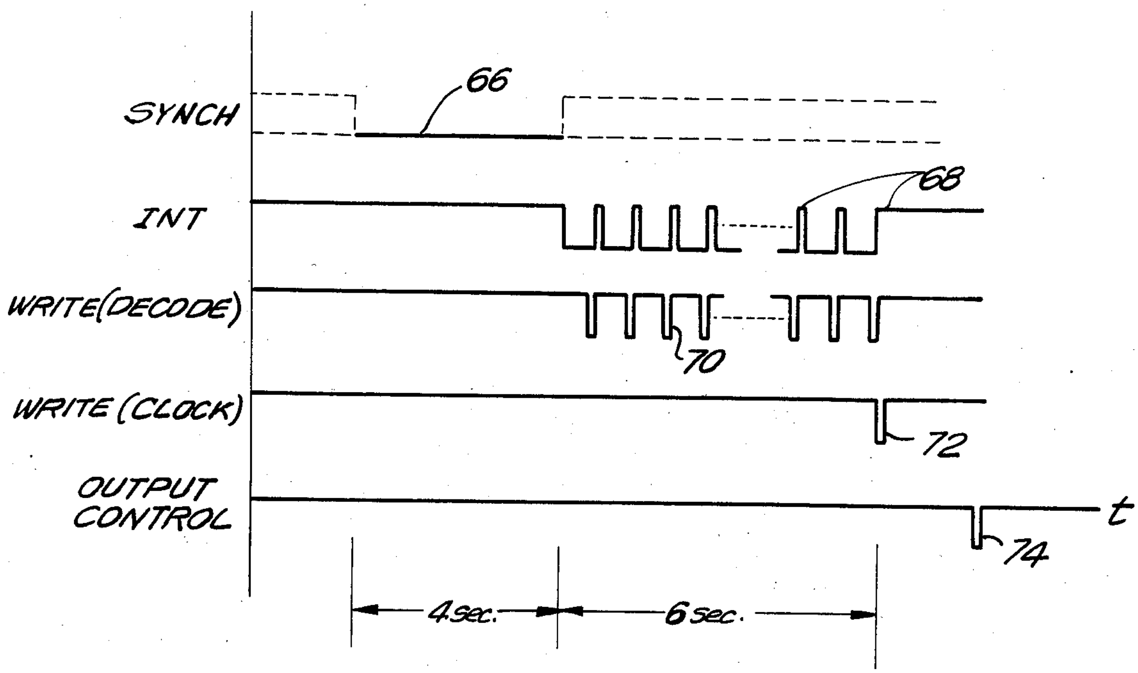

If FIG. 4A is a timing voltage diagram illustrating the timing inputs and outputs associated with the controller of FIG. 4 and the decoder of FIG. 3.

BRIEF DESCRIPTION

In brief, in a broadcast embodiment of this invention, a broadcast signal is transmitted in the usual fashion. If a portion of the program such as an advertisement is to be encoded, then for a short period of time, such as ten seconds, the broadcast material is passed through a band rejection filter which filters out a notch of approximately 500 Hertz in width (at minus 60 db) around a center frequency of approximately 4500 Hertz. At the same time a coded message signal is added to the program material. This message signal includes a code portion composed of bits, each bit having a two hundred (200) milli-second duration. The bits have one of two frequency values, thus providing a binary code. The first value bit is a sinusoidal signal centered in the upper quarter of the notch and the second value bit is a sinusoidal signal centered in the lower quarter of the notch. These are termed mark and space bits in FSK terminology. The mark center frequency and space center frequency are aproximately 400 Hz apart. During the ten second period when the message signal is applied, the first four seconds are an initialization portion which is four seconds of the higher frequency signal. The code portion itself extends over six seconds and is constituted by 200 milli-second intervals of one or the other frequency with no time in which there is no signal. Thus the bits are back to back.

In order to assure that the message signal is substantially inaudible, its level partially tracks with the program audio level. For this purpose the audio level is sensed and a code level control signal generated which controls the amplification factor of a voltage controlled amplifier through which the message signal is passed.

The notch filter is gradually switched into and out of the circuit over a one second time period in order to avoid a sharp discontinuity that might be audible. To achieve this result, the program signal is normally fed through a voltage controlled amplifier (VCA) along a path that is parallel to the band reject filter. When the code signal is to be applied, the control voltage input on the VCA is caused to ramp down over a one second time period so that the audio signal on this normal path gradually decreases to zero. At the same time, the input to the band reject filter ramps up from zero to full audio value. The output from the band reject filter is summed with the output from the VCA thereby providing a constant level program signal except for the removal of the small amount of audio program material in the notch. The ramping up of the input to the band reject filter is achieved by applying the output of the VCA as one input to a difference circuit and by having the other input to the difference circiut a direct line from the audio input. These two inputs are normally equal and thus the output of the difference circuit is normally zero. This difference circuit output is applied as the input to the band reject filter. However, as the output of the VCA ramps down, the differential input to the difference circuit ramps up and the output from the difference circuit ramps up thereby providing the audio signal as the input to the band reject filter. Thus at the end of about one second, the transition is made and the program material comes entirely through the band reject filter.

After this transition is made, the encoded message is added to the output of the band reject filter to provide an encoded program for recording and transmission.

At the receiver, a decoder is employed which extracts the code from the input audio signal and places it on an appropriate record together with a time signal to indicate the time of receipt.

This decoder includes first and second band pass filters, one of the band pass filters being a narrow band around the upper frequency (mark) code signal and the other being a narrow band around the lower frequency (space) code signal. In this fashion the code signal is extracted from the program material and background noise by virtue of each of these two filters excluding everything except the coded message in the notch created at the encoder. The outputs from these two band pass filters are then added together and applied to a phase locked loop to provide a voltage signal having a first value in response to the mark frequency and second value in response to the space frequency. Each bit, now being one of two voltage levels, is applied to an integrator circuit in order to provide an output that takes advantage of the bit information over the entire bit period. This requires that the integrator circuit is synchronized with the code signal and reset at the end of each bit period.

This synchronization is achieved by providing a synchronization signal in response to the output from the mark band pass filter. In order to assure that this synchronization is not initiated by noise or regular or distorted program material coming through the mark band pass filter, the generation of the synchronization signal is disabled unless both of two other conditions are met. One of these enabling conditions is that the output of the space band pass filter is below a threshold, thus indicating that the notch is present. This condition indicates that it is not significant program material which is coming through the mark band pass filter. The second condition is that the output of the phase locked loop exceed a threshold indicating there is a mark signal present. This assures that even if a noise pattern exists that gets through the mark filter enough to enable the generation of the synchronization signal, the possible absence of an actual mark signal at the output of the phase locked loop will disable the synchronous signal generation.

In addition, a fourth safety criteria requires that the synchronization signal be in existence for at least three seconds of the four second initialization period. If it is not in existence for that time period, then the generation of the control signal for the integrator circuit is aborted.

DESCRIPTION OF THE PREFERRED EMBODIMENTS

The basic structure of this invention can be understood by reference to the block diagrams of FIGS. 1 through 4 which show the encoder and decoder portions of the system.

The Encoder

The program material is provided to the encoder as an audio input at 10. As long as it is not to be coded, it is applied through a voltage controlled amplifier (VCA) 12 and summing circuit 14 to whatever record 16, such as a tape, is made of the material prior to use of the material, for example, in a radio or television broadcast. The VCA 12 can be considered to have a normalized amplification factor of "one". A capacitor C1 holds a predetermined dc voltage VA as a first input 12*a* to the VCA 12. The VCA 12 is adjusted so that when this predetermined voltage Va is applied, that amplification factor is one.

During the normal operating condition, when no coded signal is applied, the other two inputs to the summing circuit 14 are non-existant or zero.

There is no output from the band reject filter 18 because the difference circuit 20 is devised so that its two inputs are equal and thus its output is zero. In this normal operating condition, the output from the VCA 12 is equal to its input. The VCA input is one of the input to the difference circuit 20 and the VCA output in the other input to the difference circuit 20. Thus the two inputs to the circuit 20 are equal, its output is zero and thus the output from the filter 18, applied to the input 14*a* of the summing circuit 14 is zero.

Figure 1:
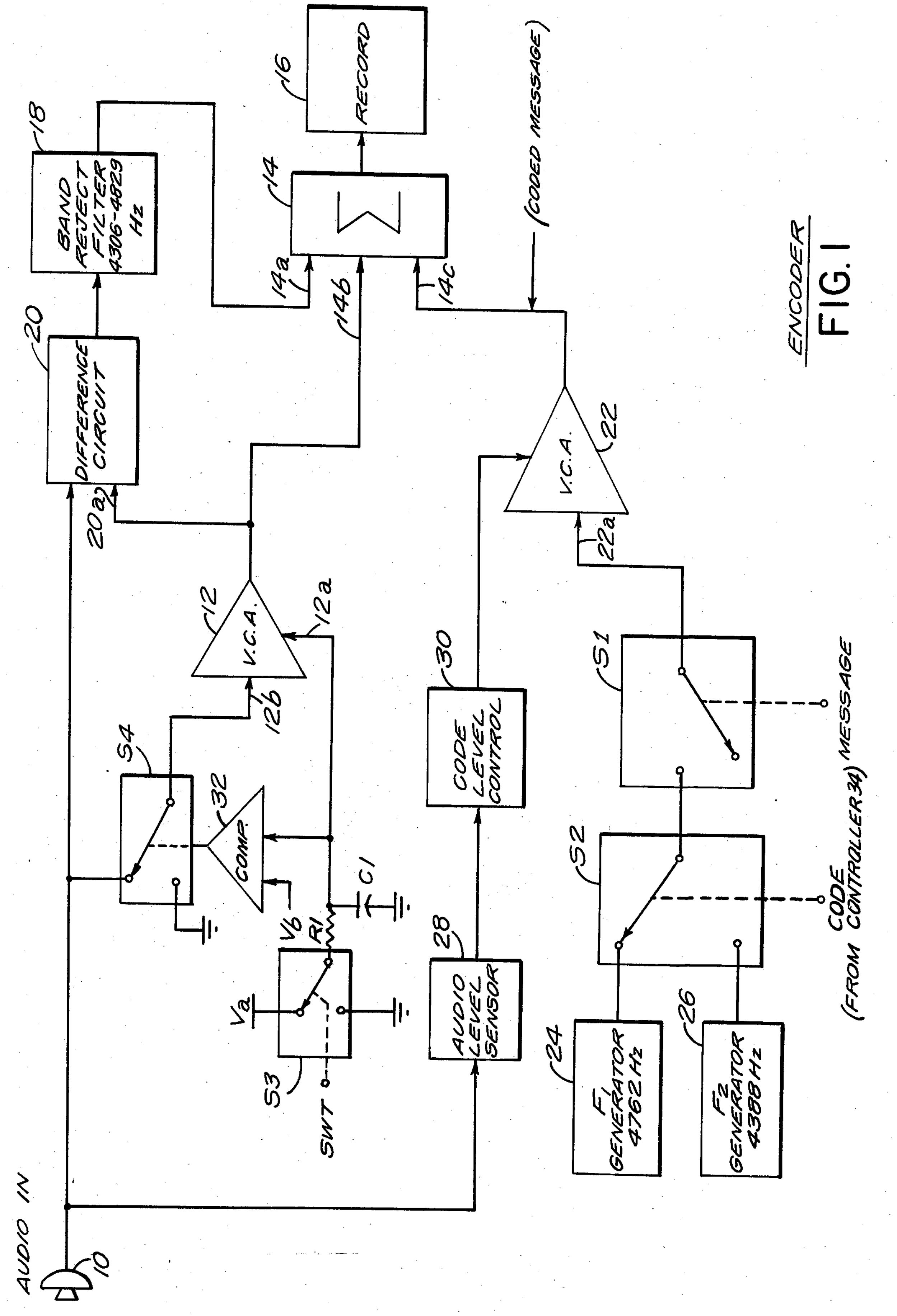
FIG. 1 is a block diagram of the encoder portion of the system of this invention. The encoder adds the identifying code to the program material so that a combined code and program can be placed on a record.

The switch S1 is in its normally open position as shown in FIG. 1 so that the signal input to the code VCA 22 is zero. Thus the output of the code VCA 22 is zero so that the third input, at terminal 14*c*, to the summing circuit 14 is zero.

It is only when the code is to be applied that the inputs at the terminals 14*a* and 14*c* are generated. In broad terms, it helps to keep in mind the three major functions that are performed by the circuitry shown.

A first function is associated with the capacitor C1, the program VCA 12 and difference circuit 20. It is to provide a gradual transition of the audio signal from the terminal 14*b* of the summing circuit to the band reject filter 18 and thus to the terminal 14*a* of the summing circuit. This gradual transition avoids or minimizes any discernable audible switching that a listener might perceive.

The second function is the generation of the encoded message and is associated with the frequency generators 24 and 26. When the switches S1 and S2 are appropriately actuated, this provides the encoded message, through the VCA 22, that is applied at terminal 14c of the summing circuit 14.

Third, in order to cause the level of the encoded message to partially track with the main program audio level, an audio level sensor 28 and code level control 30 circuit apply an appropriate bias to the VCA 22 so as to adjust the level of the code signal output from the VCA 22. This serves to minimize the audibility of the code to a listener.

Figure 2:
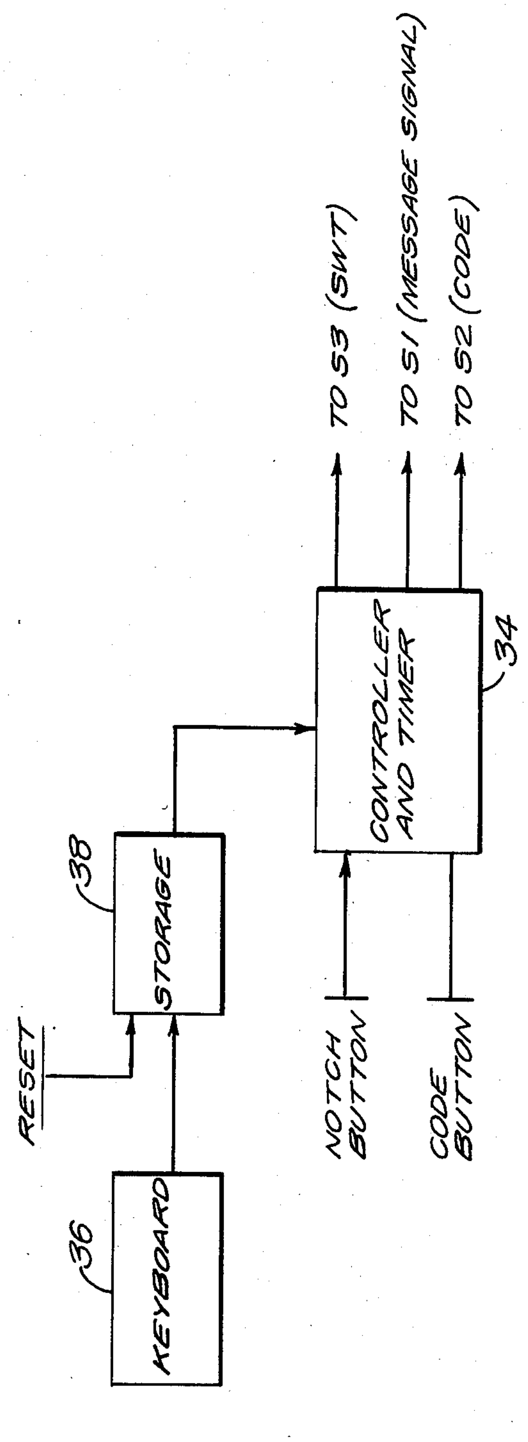
FIG. 2 is a block diagram of the controller arrangement that operates with the FIG. 1 encoder circuitry to provide the appropriate timing for the various codes in the FIG. 1 encoder.
Figure 2A:
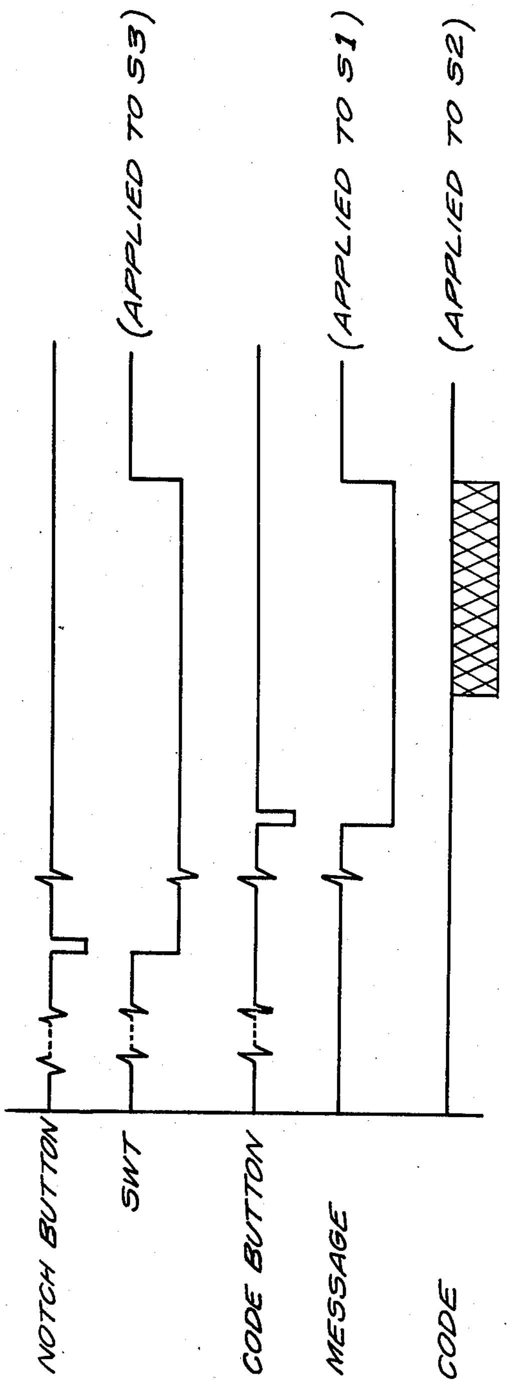
FIG. 2A is a time voltage diagram illustrating voltage level outputs of the FIG. 2 controller. These outputs constitute the control voltage inputs to the FIG. 1 encoder.

A controller and timing circuit 34 is employed to provide certain inputs to the FIG. 1 encoder. This controller and its timing signals are shown in FIGS. 2 and 2A. The timing signal outputs from this controller are shown as certain switch control inputs in FIG. 1. To facilitate comprehension, the switches S1, S2 and S3 are shown as electro-mechanical switches. These are somewhat more complex solid state switches. But in fact each is a two state switch, the state being controlled by a signal from the controller.

More specifically, when it is desired to encode a particular portion of the program material, such as an advertisement, the operator enters the code as bits of two values. Thus a binary code is entered from a keyboard 36 to a storage device 38 which is then made available to the controller 34 to input into the encoder of FIG. 1. At the time the code is to be placed on the program, the operator presses a button labeled "notch" which provides a pulse signal to the controller that causes the output SWT from the controller to go from a high value to a low value and to be held low until termination of coding. This change in value of the SWT signal causes the switch S3 to change state from the state shown in FIG. 1, to one in which the high side of the capacitor C1 is switched from a connection through R1 to Va to a connection through R1 to ground. The result is that the voltage held at the terminal 12a by the capacitor C1 goes to ground over a time period of about one second. This reduces the VCA 12 amplification from "one" down to "zero". The reduced output from the VCA 12 provides not only a reduced input at the terminal 14b of the summing circuit 14 but also a reduced input at the terminal 20a of the difference circuit 20. The result is that the two inputs to the difference circuit 20 diverge over a one second time period until the input at terminal 20a goes to zero. At that point, the input at terminal 14b of the summing circuit is zero and the output of the difference circuit 20 is the full value of the audio program signal. This audio program signal now goes through the band rejection filter 18 and becomes the audio input to the summing circuit 14. During the one second transition period the fading out of the signal on terminal 14b and the increase of the signal at the terminal 14a occurs in synchronization. Thus the net value of the audio program signal applied to the summing circuit 14 remains substantially constant except for the removal of the relatively small audio component that resides within the band width of the filter 18.

The comparator 32 makes certain that the VCA output 12 goes to complete zero at or near of the end of the decline of the voltage at the capacitor C1. A small constant voltage Vb, which is a small fraction of the Va voltage held by the capacitor C1, is applied as one of the inputs to comparator 32. The other input is the voltage at capacitor C1. As long as the voltage at the capacitor C1 is greater than Vb, the comparator 32 output holds the switch S4 in the normally closed shown. But once the voltage at C1 drops below Vb, the comparator 32 output switches state and causes the switch S4 to change and thereby connect the terminal 12b of the program VCA 12 to ground. This assures zero input at one of the VCA 12 terminals. At this point the transfer to operation through the band reject filter 18 has been completed and the code can be placed on the program material.

At present, it is preferred that the operator select the exact moment for placing the code on the program material as a function of the most desirable place to insert the code. Although the code will normally be inserted at both the beginning and the end of the program material to be encoded, it may be desirable to avoid doing so during a point in time when there is no audio message being transmitted.

Accordingly, the operator next presses a button marked "Code" which generates a pulse that actuates the controller 34 to drop the normally high voltage on the Message signal input to the encoder to a low voltage. This change in state of the Message signal causes the switch S1 to change state from the normally open state shown to a closed state which then connects the input 22a of the VCA 22 to the output from the frequency generator 24. Thus a mark signal is applied to the VCA 22 and passes on to the summing circuit 14. This mark signal holds steady for a predetermined period of time, four seconds in one embodiment, after which time the actual code signal from the controller is applied to the switch S2 causing the switch S2 to switch between the two generators 24 and 26. In so doing, mark and space signals are applied in a back to back fashion through the VCA 22 to the input 14c of the summing circuit 14. In this fashion a coded message signal is added to the audio material and recorded at the record 16.

The coded message signal is composed of an initialization component of approximately four seconds steady mark signal followed by the code signal which is a series of approximately 200 millisecond bits that differ from one another only in the frequency of the substantially sinusoidal signal being transmitted during each 200 millisecond bit time period.

At the end of the message, the SWT value switches back to high and causes the switch S3 to connect C1 to Va.

The Decoder

The block diagram of FIG. 3 illustrates the operation of the decoder. The transmitted message is appropriately received and processed by whatever receiver or other equipment exists upstream from the decoder shown in FIG. 3. An audio signal is derived from that standard upstream equipment and provides the input to the decoder.

A high pass filter and amplifier 40 is employed to cut out the bulk of the audio signal so that the rest of the decoder will operate on a signal that has an improved signal to noise ratio. In this fashion a certain amount of prefiltering is employed. The high pass filter has a nominal roll off frequency (minus 3 db point) of 3 KHz and preferably rolls off at eighteen decibels per octave. The output from this prefiltering 40 is applied in parallel to the two band pass filters 42, 44.

The band pass filter 42 is centered at the mark frequency while the band pass filter 44 is centered at the space frequency. These two filters 42 and 44 are as sharp and narrow as possible so as to provide the best signal to noise ratio yet wide enough to tolerate frequency errors. It should be noted that in the encoder shown in FIG. 1 the band reject filter 18 provides a notch wide enough to accept both the mark and space frequency signals. By contrast, in the decoder the filters 42 and 44 are each separate filters specific to one of the two frequencies used for mark and space.

In broad terms, this decoder employs four parallel paths of data processing. These four paths may be said to be represented by the four comparators 46, 48, 50 and 52.

The output of the comparator 48 is the decoded signal and is indicated on the figure with the label "decode". The other comparators 46, 50 and 52 provide an indication that a coded message has been received and provide the timing reference point for synchronous decoding. Only if each of these three comparators validate the existence of this coded message is a SYNCH output signal provided to the digital controller 62 of FIG. 4. Receipt of the SYNCH signal by the FIG. 4 controller 62 causes the controller to enable the memory 64 to record the code signal output from the comparator 48. This SYNCH enabling signal is generated only if all three comparators 46, 50 and 52 operate to validate three parameters indicating presence of an encoded message.

First, the comparator 46 responds to the existence of a mark signal at the beginning of the message to provide a validation of the fact that there is the expected initialization segment mark signal input. Thus the comparator 46 provides an initialization segment validation signal.

Second, the comparator 52 responds to the fact that a notch has been cut out of the audio input so that the output of the band pass filter 44 will show the absence of the audio signal in that notch band. The comparator 52 responds to that absence of audio to provide a notch validation signal.

Third, the comparator 50 responds to the output of the mark/space code processing branch to validate the detection of the encoded message.

With all three comparators 46, 50 and 52 switched into their proper state, the SYNCH signal is provided and the memory 64 will be enabled by the controller 62 to record the coded message.

The outputs of the two band pass filters 42, 44 will include the encoded message when such is present. The output of these two filters is added together in the summing circuit 54, processed by the amplifier and limiter 56 and applied to a standard phase locked loop 58. The phase locked loop 58 converts the input frequency into a voltage. Accordingly, the analog output of the phase locked loop 58 is nominally a first voltage when responsive to the mark frequency signal and a second voltage when responsive to the space frequency signal. Thus the two value bits are converted from two frequency values to two voltage values. The phase locked loop 58 also tends to lock onto signal and reject noise.

The integrator circuit 60 converts each bit to an integrated value, which is applied, in sequence, to the comparator 48. The reason for the integrator circuit 60 is that it provides the instantaneous value of the bit averaged over the bit duration rather than sampling the bit at only one point in time. Accordingly, the effect of noise spikes and the like is minimized. For the integrator circuit to perform this function it has to be synchronized to each bit as it comes along and has to reset at the end of each bit. Accordingly an appropriate timing and setting signal INT 68 is provided from the controller 62. This INT signal 68 is provided in response to receipt of the SYNCH signal at the controller. The SYNCH signal causes the integrator circuit 60 to be timed and synchronized with the start of the code portion of the message signal.

More specifically, when the INT signal is high, the output of the integrator circuit 60 is forced to be equal to $V_c$, the voltage representing the midpoint of the mark and space values of the phase-locked loop 58 voltage output. When the INT signal is low, the intergrator circuit 60 is allowed to integrate the voltage difference between $V_c$ and the output of the phase-locked loop 58. Thus, it will ramp up when a mark is present and down when a space is present. At the end of the bit, it is compared to the starting voltage $V_c$ at comparator 48 and thus determined to be a mark if greater than $V_c$ or a space is less than $V_c$. This is the decode output provided to the storage device 64.

As seen in timing diagram 4A, when the SYNCH signal 66 is generated for sufficient time, the INT signal is switched low at the point four seconds after the reference time for the start of the message. At the end of the bit, a WRITE (decode) pulse 70 enters the value of the output of comparator 48, which is the decoded value of the bit, into the storage device 64. Then the INT signal 68 goes high for a short time in order to reset the output of the integrator circuit to $V_c$. This repeats for each succeeding bit.

After the last bit has been entered, the WRITE (clock) pulse 72 enters the hour, minute, and second information from the digital clock 76 into the storage device 64. Then the OUTPUT CONTROL pulse 74 causes the storage device 64 to output the decoded message information along with the time information. Finally a CLEAR signal resets the storage device 64 to be ready to accept another message.

The detection of the message and generation of the timing reference point is critical. The generation of the SYNCH signal basically requires the detection of the mark frequency at the beginning of the four second initialization segment of the encoded message. Such a mark signal will pass through the mark band pass filter 42 be amplified by amplifier 66 and be detected by the envelope detector comprising the diode D2 capacitor C2 and resistor R2. The output of this envelope detector circuit is applied as one of the two inputs to the comparator 46. The other input $V_{tm}$ is a dc value representing a threshold voltage level below the expected detected mark voltage level. When the comparator 46 input from the envelope detector circuit exceeds $V_{tm}$, the comparator 46 is switched into a state so that it is enabled to provide the SYNCH signal to the controller 62.

However, there is a real risk that noise spikes or perhaps regular or distorted program material might come through the mark band pass filter 42, when there is no encoded message, with sufficient amplitude to give a false or premature SYNCH signal. The enabling input to the comparator 46 is held at a ground state by the output of the comparator 50 and also by the output of the comparator 52 unless both the comparator 50 and the comparator 52 are switched to a high state. Since comparators 50 and 52 have open collector outputs, they do not alter the input to comparator 46 when they are in the high state.

When the notch is created, then at the beginning of the message, ideally nothing will come through the space band pass filter 44. This situation is detected by the amplifier 68 and envelope detector circuit diode D3, capacitor C3 and resistor R3. When the signal provided by such detection drops below a threshold determined by the voltage $V_{ts}$, then comparator 52 switches into its high output state. Normally, however, the program material that does come through the filter 44 is sufficient to hold the comparator 52 at its ground output state much of the time thereby effectively disabling the comparator 46. But when the notch is provided, the filter output 44 will drop sufficiently so that comparator 52 is switched into its high output state.

In order to make sure that a SYNCH signal is provided in response to the encoded message, it is important that the threshold dc signal $V_{tm}$ be kept low enough and the threshold dc signal $V_{ts}$ be kept high enough so that, at the start of the message the comparator 46 may be enabled and at the same time the comparator 52 will be switched into its high state.

The comparator 50 provides further assurance that the encoded message is present for the SYNCH signal to be generated. When the output of the phase locked loop 58 indicates the presence of a mark signal, then the comparator 50 is switched into a high output state thereby removing the second ground clamp on the enabling input to the comparator 56. The comparator 50 is switched into this high output state when the output from the loop 58 exceeds the voltage $V_c$ discussed above. This occurs when the strongest discrete signal into the phase-locked loop is closer to the mark frequency than to the space frequency. Thus, noise or regular or distorted program material which might erroneously enable comparator 46, might not switch comparator 50 into its high output state. Accordingly, the function associated with this comparator 50 provides further assurance that a false or premature SYNCH signal will not be generated.

Finally, to minimize the risk that the memory 64 will be enabled to record meaningless outputs from the comparator 48, the controller 62 is programmed so that it will provide its enabling output signal to the memory 64 only if the SYNCH signal from the comparator 46 is present for at least three seconds out of the four second initialization period. If not, it will be ignored.

In this fashion a decoder is provided which will reliably respond to the presence of the message and which will reliably avoid generation of false or premature SYNCH signals. Of course, if there are rare occassions where a false SYNCH signal is generated for sufficient time to enable the decoder, they will normally not create any particular problem since the message or code recorded on the memory 64 in response to a false SYNCH signal will be meaningless and because of the clock time associated with it, will be unassociated with any advertisement or other program material that has been encoded. However, it is obviously important that the number of false SYNCH signals be minimized. It is more important that the SYNCH signal be generated each and every time an encoded message is provided. The system of this invention permits, through selection to the proper threshold voltages, the provision of a system which will reliably generate the SYNCH signal whenever an encoded message comes through and which will generate a de minimus number of false SYNCH signals.

Thus, it is seen that several conditions are required to generate the function which tells the decoder that a message is present and gives the correct timing reference point. This is necessary due to the presence of noise and distorted program material when a notch is present as well as the normal presence of frequencies in the code region when no notch is present. The combination of all the conditions provides a net result which is statistically sufficient to allow successful operation of the system.

Another important point to note is the use of separate band pass filters 42 and 44 for mark and space. Normally with frequency-shift keying, only one band pass filter is used, and the frequency separation between mark and space is relatively small. In this application, the noise environment is severe. This is due to two primary reasons. First, when no notch is present in the broadcast material, there are normally present many signals in the code frequency region with relatively very high amplitude. Second, when the notch is present, distortion in the broadcast chain, especially due to modern audio processing equipment, creates undesired signals back into the notch region.

By using two narrow band pass filters at a relatively large frequency spacing, a great advantage is gained in signal to noise ratio. This makes possible correct message detection, accurate determination of the timing reference point, and correct decoding of the bits themselves.

Particular Values

In one embodiment that has been tested, and that is presently preferred, the following particular values and ranges are employed.

The mark generator 24 provides a sinusoidal signal of 4762 Hz. The space generator 26 provides a sinusoidal signal of 4388 Hz.

The band reject filter 18 has a center frequency of 4567 Hz and a band width of 524 Hz at minus 60 db. It should be noted that the filter 18 is conveniently a single band pass reject filter but that the equipment could be designed to employ two separate band reject filters specific to the mark and space frequencies. The two frequencies are widely enough spaced from one another so that such is feasible and indeed two separate filters must be employed in the decoder. It has been found that any degradation in audio performance because of the use of a single filter to cover the two separate bands is negligible.

The code level control is set to provide a coded message level at the output of the summing circuit 14 that is a function of the extent of program audio modulation, whether the program is voice or music and whether the transmission is frequency modulation (FM) or amplitude modulation (AM). Using code level designations, relative to one hundred percent modulation, these coded message levels for voice on FM may range from minus 52 db when there is no audio to minus 49 db when there is 100% modulation, and for music on FM may range from minus 49 db to minus 45 db. For AM these decibel ranges might run from minus 45 db to minus 42 db if encoding voice program material and might run from minus 42 db to minus 38 db for encoding music.

The mark band pass filter 42 has a center frequency of 4762 Hz and a band width of 266 Hz at minus 60 db. The space band pass filter 44 has a center frequency of 4388 Hz and a band width of 267 Hz at minus 60 db.

For that embodiment a 32 bit code is employed so that the code portion of the coded message is 6.4 seconds.

The above figures are provided to give an example of one system that has been tested and found workable.

Experience and testing will dictate variation in these values.

Furthermore it should be appreciated that such parameters as the specifications selected for the filters and the level of the code signal will be affected by consideration of cost, reliability, level of inaudibility to average listener and the extent of distortion imposed on the program material by the transmission medium.

What I claim is:

1. In a system for accompanying audio program material with a substantially inaudible audio frequency secondary message signal, the secondary message signal including an initial portion and a multi-bit code portion having mark bits within a first frequency band and space bits within a second frequency band, said first frequency band occupying a first notch in the frequency band of the audio program material and said second frequency band occupying a second notch in the frequency band of the audio program material, the decoder comprising:

a first bandpass filter substantially centered on the center frequency of said first notch, said first bandpass filter being coupled to at least a portion of the audio program material to provide an output signal comprising primarily the mark bits, a second bandpass filter substantially centered on the center frequency of said second notch, said second bandpass filter being coupled to at least a portion of the audio program material to provide an output signal comprising primarily the space bits, said first and second bandpass filters covering separate frequency bands, spaced from one another, a summing circuit for adding the outputs of said first and second filters, a converter coupled to the output of said summing means and responsive to the frequencies of said mark and space bits to provide a first voltage in response to said mark bit and a second voltage different from said first voltage in response to said space bit, a first comparator circuit responsive to the output of said first bandpass filter to provide a first enabling signal in response to an output from said first bandpass filter that exceeds a first threshold, said first threshold being set below the signal level to be expected from said first bandpass filter during the receipt of a mark bit.

2. The decoder of claim 1 further comprising:

a second comparator circuit responsive to the output of said second bandpass filter to provide a second enabling signal in response to an output from said second filter that is below a second threshold, said second threshold being above the level to be expected from said second bandpass filter during the receipt of a space bit, a third comparator responsive to the output of said converter to provide a third enabling signal when the output of said converter exceeds a third threshold, said third threshold being substantially between said first and second voltages provided by said converter, and below the voltage expected during the receipt of a mark bit by said converter, a coincident circuit responsive to said first, second and third enabling signals to provide a synchronization signal when said three enabling signals are all coincident in time.

3. The decoder of claim 2 further comprising:

a memory, and timing means responsive to said synchronization signal to provide a timed set of reset signals and a timed set of write signals, each of said write signals, writing the output of said integrator into said memory as a mark bit or a space bit at the end of each bit time period, each of said reset signals reseting said integrator circuit after each write signal has completed its write function.

4. The decoder of claim 3 wherein:

said timing means provides said reset and write signals only in response to the continued presence of said synchronization signal for a first predetermined time period.

* * * * *